Sept. 16, 1969          H. W. STIER          3,466,955
TOOL HOLDER
Filed May 17, 1967          2 Sheets-Sheet 2
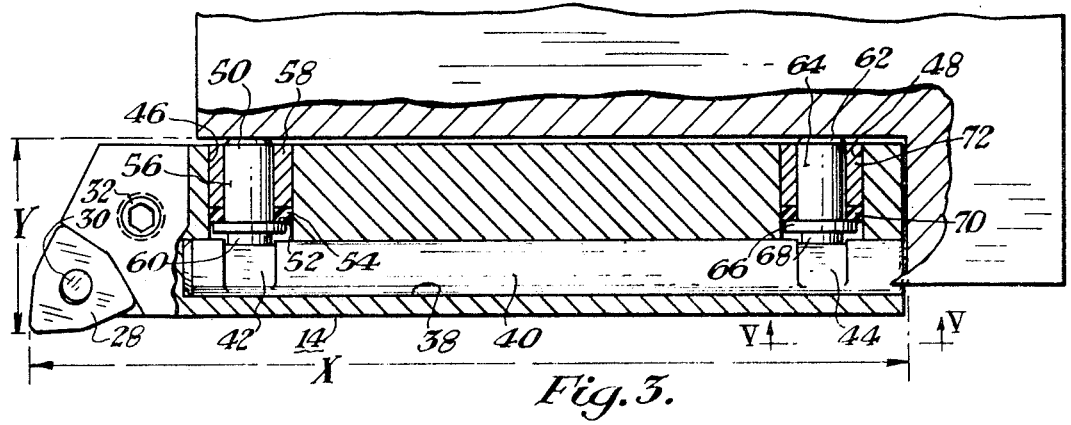
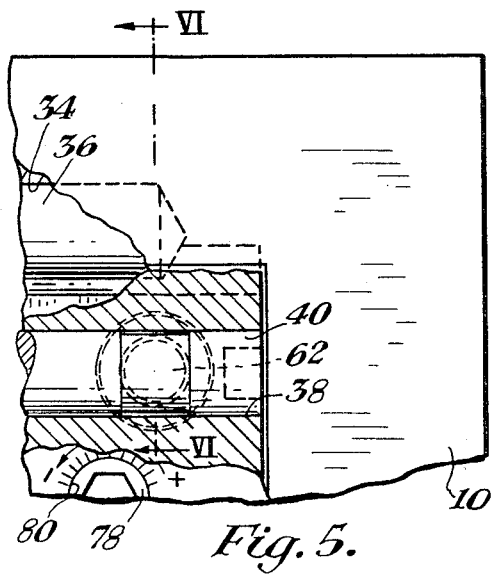
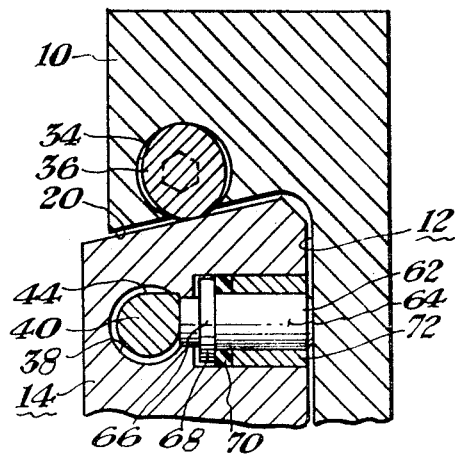
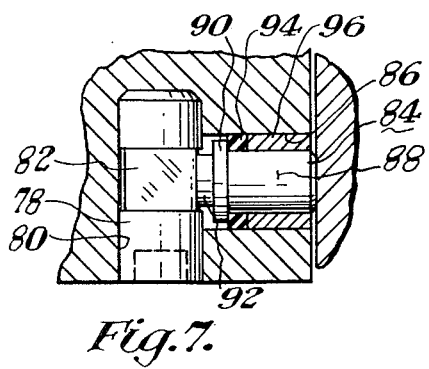
INVENTOR
Henry W. Stier.
BY John D. Mesaros
HIS ATTORNEY United States Patent Office 3,466,955
Patented Sept. 16, 1969

3,466,955
TOOL HOLDER
Henry W. Stier, Dearborn Heights, Mich., assignor to Carmet Company, Pittsburgh, Pa., a corporation of New Jersey
Filed May 17, 1967, Ser. No. 639,229
Int. Cl. B23b 29/22, 29/02
U.S. Cl. 82—36                                       9 Claims

ABSTRACT OF THE DISCLOSURE

A precision preset tool holder adapted to compensate for deviation in cutting inserts, the tool holder being provided with an axial bore into which is inserted a pin having a pair of cam surfaces, each cooperating with a support pin extending transverse thereto and out of said tool holder for engaging a tool block. A second cam is positioned in a transversely extending bore to cooperate with a third support pin which extends out of the rearward portion of said tool holder for engaging the tool block. The cam means thus provide bi-directional adjustment with respect to the tool block to exactly position the cutting insert.

Background of the invention

In precision cutting, and especially in precision cutting with a numerical controlled lathe, machining can be accomplished more efficiently if trial cuts to determine the work piece diameter are avoided and a fast method of tool exchange combined with positive positioning in two axes is provided. Due to dimensional variations which occur in cutting inserts either through manufacturing or wear, it is virtually impossible to position the tip of the cutting insert exactly without first taking trial cuts and measuring the work piece diameter to determine what adjustment is necessary. Furthermore, in prior art tool holders of this type, the adjustment is accomplished with a wedge or with screws, and the tool holders are held in the tool block by bolts, thereby creating time consuming adjustment and replacement.

It is accordingly an object of this invention to provide a new and improved tool holder adapted for micrometer precision presetting.

It is another object of this invention to provide a new and improved precision preset tool holder adapted for rapid removal and replacement.

It is a further object of this invention to provide a new and improved precision preset tool holder which contains means for positioning the cutting insert with respect to the tool block with the tool holder in place.

It is still another object of this invention to provide a new and improved tool holder containing means for bi-directional positioning of the cutting insert with respect to the tool block.

Summary of the invention

The foregoing and other objects of the invention are accomplished by providing a tool holder with an axially extending bore into which is inserted a rotatable pin having a first cam surface adjacent the cutting insert end of the tool holder and a second cam surface adjacent the rearward end of the tool holder, each of said cam surfaces cooperating with a support pin extending transverse to the rotatable pin whereby rotation of the rotatable pin causes simultaneous movement of both support pins out from a side of the tool holder for abutting engagement with the tool block to provide spacing therefrom. A third cam surface is positioned within a transversely extending bore adjacent the rearward portion of the tool holder, the cam cooperating with a third support pin extending out from the rearward portion of the tool holder body to engage an adjacent surface of the tool block to provide spacing in a second direction. Each of said cam means is provided with a recessed polygonal aperture communicating with the exterior of the tool holder to permit insertion of an Allen wrench for adjusting the displacement of the support pins with respect to the tool holder.

Brief description of the drawings

Other objects, features and advantages of the invention will become apparent on reading the following detailed description when taken in conjunction with the accompanying drawings in which:

FIG. 3 is a partially sectioned plan view taken on line III—III of FIG. 1;

FIG. 5 is an exploded partially sectioned view taken substantially along line V—V of FIG. 3;

FIG. 6 is a sectional view taken on line VI—VI of FIG. 5, and

FIG. 7 is a sectional view taken substantially along line VII—VII of FIG. 1.

Description of the preferred embodiment

Figure 1:
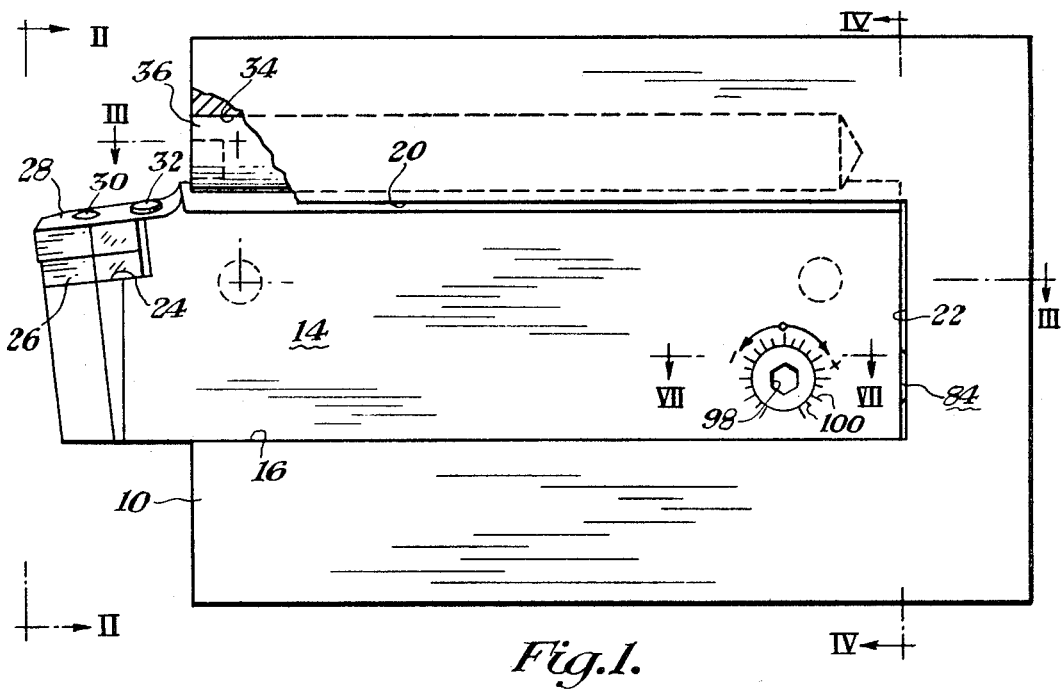
FIGURE 1 is a side elevational view of a tool holder according to the invention positioned in the tool block.
Figures 2, 4:
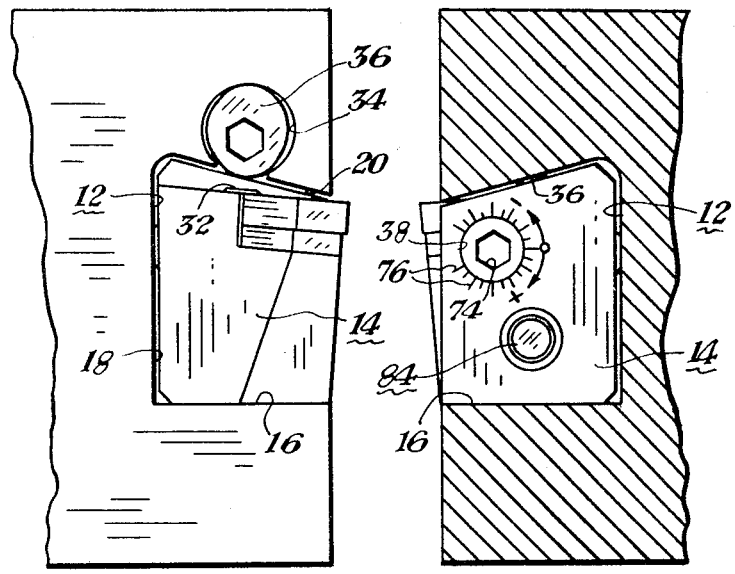
FIG. 2 is an end view of the tool holder as viewed along line II—II of FIG. 1.
FIG. 4 is a rear end view of the tool holder taken on line IV—IV of FIG. 1.

Referring now to the drawings, and particularly to FIGS. 1, 2 and 4, there is shown a tool block 10 having a cavity generally designated 12 so configured to receive a tool holder 14. Cavity 12 has a bottom wall 16 and a back wall 18 generally perpendicular thereto. The top wall 20 tapers from the back wall 18 forwardly and downwardly toward the opening of the cavity 12, wall 20 thus defining acute angles with walls 16 and 18. The cross-sectional configuration on the tool holder 14 is similarly configured to slide into the cavity 12 from the front end thereof until the rearward portion of the tool holder abuts against the rear wall 22 of the cavity 12.

Located at the cantilevered end of the tool holder 14 is a pocket or recess 24 having a shim 26 positioned thereon and a cutting insert 28 positioned on the shim, the shim end insert being secured in position by suitable fastening means such as lug 30 urged rearwardly by the screw means 32. Inasmuch as the exact locating means do not form a part of this invention, further explanation thereof is deemed unnecessary. Located in the tool block 10 immediately adjacent the upper surface of the tool holder 14 is an axial bore 34, the length thereof being opened through the upper wall 20. A cam lock pin 36 is loosely positioned in the bore 34, and upon rotation of the pin 36, the eccentric nature of the pin combined with the tapered upper surface of the tool holder 14, urges the tool holder 14 downwardly and rearwardly to thereby secure the tool holder within the cavity 12.

As can best be seen in FIG. 3, the tool holder 14 is provided with a circular bore 38 having an opening at the rearward end of the tool holder 14. A rotatable pin 40 is inserted into the bore 38, the pin 40 having a first cam surface 42 adjacent the cutting end of the tool holder and a second cam surface 44 adjacent the rearward end of the tool holder 14. Disposed transversely to cam surface 42 is an aperture 46 communicating with the side surface of the tool holder 14. A second similar aperture 48, parallel to aperture 46, is aligned with the second cam surface 44. Positioned in the aperture 46 is a support pin 50 having shoulder means 52 and having the length sufficient for extension beyond the side surface of the tool holder 14. A resilient O ring 54 (made of neoprene or any other suitable material) encircles the stud portion 56 of support pin 50 and bears against the shoulder portion 52. A suitable bushing 58 is then inserted into aperture 46 to frictionally engage the side walls thereof while permitting sliding movement of stud portions 56 therein. The cam following portion 60 of support pin 50 bears against the first cam surface 42 in constant engagement therewith.

Similarly, the second cam surface 44 has a support pin 62 with the stud portion 64, shoulder portion 66, and cam following portion 68. The O ring 70 and the bushing 72 are inserted in place to secure support pin 62. FIGS. 5 and 6 show details of the cam surface and support pin arrangement. The cam surfaces 42 and 44 are identically configured and aligned for corresponding movement. Similarly, the support pins 50 and 62 are identical in size, shape, and length, whereby rotation of the pin 40 urges support pins 50 and 62 outwardly in an identical amount. As can be seen in FIG. 4, the exposed end of pin 40 is provided with a polygonal aperture 74 into which is inserted a suitable wrench to provide the rotation of the pin 40. Radial scribe marks 76 surround the aperture 38 on the rearward surface of the tool holder 14 with a zero scribe mark indicating a point of reference. The pin 40 is also provided with a reference scribe mark.

A second rotatable pin 78 is inserted into an aperture 80 extending generally parallel to and downwardly of support pin aperture 48. The rotatable pin 78 is smaller in length than pin 40 and extends transverse to pin 40. Pin 78 is provided with a third cam surface 82, the cam surface 82 cooperating with a third support pin 84 positioned in aperture 86 which communicates with the rearward surface of tool holder 14, the support pin 84 extending outwardly from the rear end of tool holder 14. The support pin 84 is similar in configuration to the two support pins and has a stud portion 88, shoulder portion 90, and a cam following portion 92. A resilient washer means such as the O ring 94 and a bushing 96 secure the support pin 84 in position. By referring to FIG. 1, it can be seen that the rotatable pin 78 is provided with an aperture 98 adapted for insertion of a suitable wrench to provide rotation of the cam surface 82 to thereby vary the projection of the stud portion 88 of support pin 84 beyond the rearward surface of the tool holder 14. Radial scribe marks 100 are also positioned about the circumference of the aperture 80, and a zero scribe mark is provided for reference purposes cooperating with a similar reference scribe mark on the exposed surface of pin 78.

During the initial setup of the tool holder assembly, variations in insert dimensions would cause variations in the exact position of the cutting tip of insert 28 with respect to two directions, namely the direction designated X (as seen in FIG. 3), this distance being the dimension from rear wall 22 of cavity 12 to the most outwardly projecting tip of insert 28, and the distance designated Y which is the distance from back wall 18 of cavity 12 to the outer most tip of cutting insert 28. If the X and Y distances are preset, trial cuts can be avoided. The presetting of these distances are accomplished by having a gauge (not shown) separate from the machine into which is positioned the tool holder 14 with the scribe marks being set to zero in both directions. In any tool holder of this sort, there is a nominal dimension desired for X and Y and the zero scribe mark provides some reference dimension with rotation of the pins 40 and 78 in one direction from zero providing an increase in its respective dimension, and rotation in the other direction providing a decrease in its respective dimension. For example, with pin 40 positioned so that the scribe mark on the end thereof is aligned with the zero radial scribe mark, both support pins 50 and 62 extend an identical distance from the side surface of tool holder 14, and with an insert 28 of exact dimension the distance Y will be the exact desired nominal distance. If, however, the insert 28 is smaller, the distance Y will also be smaller. The pin 40 can then be rotated to rotate the cam surfaces 42 and 44 in such a direction to urge support pins 50 and 62 outwardly to compensate for the smaller size of the insert 28. Conversely, if the insert 28 is larger than pin 40, it can then be rotated in the opposite direction to thereby decrease the amount of projection of support pins 50 and 62.

Similarly, the support pin 84 can be regulated by means of pin 78 to provide variations in the X dimension. Once the tool holder is set up in the gauge, it can be immediately positioned in tool block 10 without the necessity for trial cuts. With an arrangement such as shown, one-quarter turn of cam lock pin 36 releases the tool holder 14 positioned in tool block 10, the tool holder 14 slides freely out of cavity 12 and a new tool holder 14 can be rapidly inserted, the cam lock pin 36 tightened, and cutting started without loss of time or tolerance. In actual practice, this invention allows a positioning of the cutting point of the tool within .0002" in both directions and provides extreme accuracy.

While there has been shown and described a preferred embodiment, it is to be understood that various adaptations and modifications may be made within the scope of the invention.

I claim:
1. A tool holder assembly adapted to employ disposable cutting inserts of inconsistent size comprising:
 (a) a tool holder adapted for positioning within a cavity in a tool block with the cutting tip projecting beyond the tool block;
 (b) first rotatable cam means cooperating with cam following means carried by said tool holder for adjusting the longitudinal dimension thereof;
 (c) a plurality of second cam means and a plurality of cam following means carried by said tool holder for adjusting the lateral dimension thereof whereby the cutting tip of the insert can be prepositioned in two dimensions with respect to said tool block.

2. The combination according to claim 1 wherein said second cam means includes an axial bore within said tool holder, a rotatable pin positioned within said axial bore, said rotatable pin having a first cam surface adjacent the insert end of said tool holder and a second identical aligned cam surface adjacent the rearward end of said tool holder, a first and a second support pin cooperating with said first and said second cam surfaces, said support pins extending out from the side of said tool holder whereby adjustment of said rotatable pin varies the projection of said support pins beyond the side surface of said tool holder.

3. The combination according to claim 2 wherein said first cam means includes a bore in said tool holder transverse to said axial bore, a second rotatable pin positioned within said bore, said second rotatable pin having a cam surface, a third support pin cooperating with said cam surface and projecting beyond the rearward end of said tool holder whereby adjustment of said second rotatable pin varies the projection of said third support pin out from said tool holder.

4. The combination according to claim 3 wherein each of said first, second, and third support pins has shoulder means and biasing means cooperating with said shoulder means and said tool holder for urging said support pins toward the cooperating cam surfaces.

5. In a tool holder assembly of the type employing disposable cutting inserts having dimensional variations during the manufacture thereof, the insert having a cutting tip, said assembly comprising:
 (a) a tool holder having a side surface and an end surface said tool holder being adapted for positioning within a cavity in a tool block with said side surface and said end surface abutting against corresponding walls in the cavity with the cutting tip of the insert projecting beyond said tool block;
 (b) first rotatable cam means cooperating with cam following means carried by said tool holder, said cam following means projecting from the side surface thereof for adjusting the position of the cutting tip with respect to the abutting wall surface of the cavity, and (c) a plurality of second cam means carried by said tool holder and projecting from said end surface for adjusting the position of the cutting tip with respect to the abutting wall of the cavity whereby the cutting tip of the insert can be prepositioned in two dimensions with respect to the tool block.

6. A tool holder assembly comprising:
(a) a tool block having a cavity with a first wall and a second wall extending generally transverse to said first wall;
(b) a tool holder positioned in said cavity in abutting relation with said first wall and said second wall, the free end of said tool holder having a recess for receiving an insert having a cutting edge;
(c) first rotatable cam means carried by said tool holder and cooperating with said first wall for adjusting the position of the cutting edge with respect to said first wall;
(d) a plurality of second cam means carried by said tool holder and cooperating with said second wall for adjusting the position of the cutting edge with respect to said second wall, and
(e) locking means for securing said tool holder to said tool block whereby the adjusting means compensate for tolerance deviations of the insert.

7. The combination according to claim 6 wherein said cavity has a third wall extending transverse to said first wall and a fourth wall extending generally transverse to said first wall and disposed in facing relationship with said third wall, said first, second, third and fourth walls defining an open-ended, open-sided cavity, the open side of said cavity being opposite to and smaller than said first wall, said tool holder being so configured in cross-section for insertion within the open end of said cavity, and said locking means being carried by said tool block adjacent said fourth walls for urging said tool holder toward said first and third walls.

8. The combination according to claim 7 wherein said locking means includes cam means carried by said tool block and communicating with said cavity whereby rotation of said cam means urges said tool holder toward the oppositely disposed wall and toward said first wall for securing said tool holder to said tool block.

9. A tool holder of the type employing disposable cutting inserts, the cutting tip of which is desired to be prepositioned in at least one dimension with respect to a tool block retaining the tool holder, said tool holder comprising:
(a) a bore in said tool holder extending transverse to the dimension to be adjusted;
(b) a plurality of rotatable cam means positioned in rotatable relationship with said bore; and
(c) a plurality of cam following means cooperating with said cam means and projecting beyond the surface of said tool holder in the direction of the dimension to be adjusted whereby rotation of said cam means adjusts the projecting distance to preset the dimension of the cutting tip with respect to the tool blocks.

References Cited
UNITED STATES PATENTS

| | | | |
|---|---|---|---|
| 3,283,626 | 11/1966 | Alvey et al. | 82—36 |
| 3,333,493 | 8/1967 | Bullard et al. | 82—36 |

FOREIGN PATENTS 1,406,736  6/1965  France.

LEONIDAS VLACHOS, Primary Examiner

U.S. Cl. X.R.

77—58